April 28, 1942.　　　L. W. BUCHANAN　　　2,280,888
ELECTRIC MOTOR CONTROL

Filed July 13, 1939

WITNESSES:
P. J. Fitzgerald
F. P. Lyle

INVENTOR
Lloyd W. Buchanan.
BY O. B. Buchanan
ATTORNEY

Patented Apr. 28, 1942

2,280,888

UNITED STATES PATENT OFFICE 2,280,888

ELECTRIC MOTOR CONTROL

Lloyd W. Buchanan, Covington, Ohio, assignor to Westinghouse Electric & Manufacturing Company, East Pittsburgh, Pa., a corporation of Pennsylvania Application July 13, 1939, Serial No. 284,139

8 Claims. (Cl. 172—279)

The present invention relates to the control of self-starting, single-phase induction motors, and more particularly to a control system for plugging or rapidly reversing a single-phase, capacitor-start motor.

Capacitor-start motors usually have a main or running primary winding, and an auxiliary or capacitor winding which is displaced spatially 90 electrical degrees from the main winding and which has a capacitor connected in series with it. In starting, both windings are connected in parallel to a single-phase supply line, and the capacitor causes a phase displacement between the currents in the two windings which provides a starting torque for the motor similar to that in a two-phase motor. A centrifugal switch is connected in series with the capacitor winding to disconnect the winding from the line when the motor reaches a predetermined speed, usually about 75% of its rated speed, after which it runs as a single-phase induction motor.

In many applications of such motors, such as hoists, for example, it is desirable or necessary to provide for plugging control of the motor, i. e., stopping it or rapidly reversing it by reversing the connections while the motor is running. Obviously, this cannot be done with the conventional arrangement just described, since the centrifugal switch keeps the capacitor winding disconnected until the motor has slowed down to about 40% or 50% of its full load speed, and reversing the connections while the motor is running at a higher speed than this has no effect, since it continues to run in the same direction on the main winding alone.

A control system for plugging motors of this type is shown in the copending application of Walter Schaelchlin, Serial No. 247,440, filed December 23, 1938, and assigned to the Westinghouse Electric & Manufacturing Company. The system shown in this application uses a voltage relay for disconnecting the capacitor winding. This relay is connected so as to be responsive to the voltage across the capacitor winding, which increases as the motor speeds up, and is set to open its contacts and disconnect the winding when the motor reaches about 75% speed. When the winding connections are reversed, the relay is deenergized and closes its contacts, and since the motor is rotating at a negative speed after the reversal, the voltage across the capacitor winding is not great enough to cause the relay to operate, and the winding, therefore, remains connected, so that effective plugging control of the motor is obtained. This system has the disadvantage, however, that the voltage across the starting winding is dependent upon the line voltage as well as upon the speed of the motor, and variations in the line voltage therefore cause corresponding variations in the point at which the relay operates. It is also necessary in this system to make the relay contacts sufficiently heavy to withstanding interrupting the current in the capacitor winding.

The object of the present invention is to provide control means for plugging, or rapidly reversing, a single-phase, capacitor-start motor which uses a voltage relay but which is not affected by variations in the line voltage, and in which the relay contacts are not required to interrupt any appreciable flow of current.

More specifically, the object of the invention is to provide control means for a single-phase, capacitor-start motor in which a speed responsive switch is used to disconnect the capacitor winding when the motor reaches a predetermined speed in either direction of rotation, and a voltage relay responsive to the voltage across the capacitor winding is used to reconnect the capacitor winding to the line as soon as the connections are reversed for plugging. By using a centrifugal switch of the usual type in this way, the operation is made independent of variations in the line voltage since the operation of the switch depends only on the speed of the motor, and the relay contacts can be made quite light, since they are not required to interrupt the capacitor winding current, so that a relatively small and inexpensive relay can be used.

The invention will be more fully understood from the following detailed description taken in connection with the accompanying drawing, in which.

Figure 1:
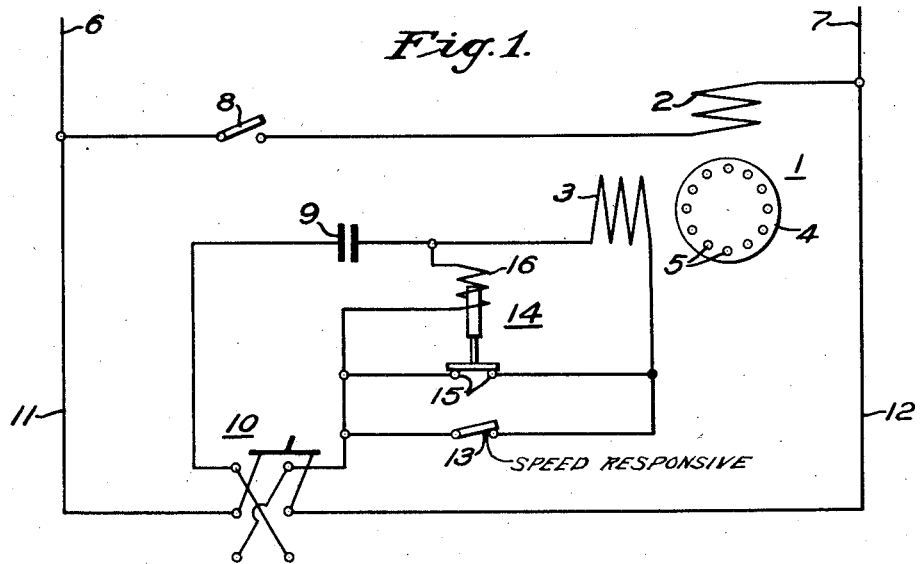
Figure 1 is a wiring diagram showing one embodiment of the invention.

The invention is shown in Fig. 1 as applied to a single-phase induction motor 1 having a main or running primary winding 2 and an auxiliary or capacitor primary winding 3 which is displaced 90 electrical degrees from the main winding. The motor has a rotor member 4 which preferably has a short-circuited squirrel cage secondary winding, indicated at 5. The main winding 2 is connected across a single-phase supply line 6, 7 through a line switch 8. A capacitor 9 is connected in series with the winding 3 in order to cause a phase displacement of the current in the winding with respect to the current in the main winding 2 to provide starting torque. The capacitor winding circuit is connected to the line through a reversing switch 10 by conductors 11 and 12. The capacitor winding is controlled by a centrifugal switch 13, of any suitable type, and a voltage relay 14, which has contacts 15 and a voltage responsive operating coil 16. The relay contacts 15 are connected in series with the winding 3, and the operating coil 16 of the relay is connected across the winding 3 and contacts 15. The centrifugal switch 13 is connected in parallel with the relay contacts 15, and is preferably adjusted to open at about 75% of the rated speed of the motor in either direction of rotation.

The operation of this system will be more readily understood by considering the voltage conditions across the capacitor winding. At standstill, the capacitive reactance of the capacitor 9 is considerably greater than the inductive reactance of the winding 3 and the voltage across the winding is, therefore, less than that across the capacitor. As the motor accelerates, however, the effective inductance of the winding 3 increases and its reactance becomes more nearly equal to the reactance of the capacitor, so that a condition of resonance is approached and the current and the voltage across the winding 3 increase as the motor speeds up. If the connections of the motor are reversed while it is running, the motor is then rotating at a negative speed with respect to the windings, and the effective inductance of the winding 3 is greatly decreased, so that for negative speeds of the motor, the voltage across the winding is less than the voltage at standstill. This effect is utilized in the present invention by adjusting the relay 14 so that its operating coil causes the contacts to open when the voltage across the winding 3 is slightly greater than the voltage corresponding to standstill, so that the relay contacts are open for voltages higher than this value and remain closed at all lower values of the voltage across the winding 3.

The operation of this system should now be apparent. In starting the motor, the line switch 8 is first closed to energize the main winding 2. The motor is then started by closing the reversing switch 10 in the position giving the desired direction of rotation to energize the auxiliary winding 3. Since the capacitor 9 causes a phase displacement between the currents in the two windings, a starting torque similar to that of a two phase motor will be produced and the motor will start in the usual manner. As the motor starts, the voltage across the winding 3 begins to rise and when it has risen to a value slightly greater than that at standstill, the relay 14 is energized and opens its contacts 15. The centrifugal switch 13, however, remains closed at this time so that the opening of the relay contacts has no effect and the motor continues to accelerate. The switch 13 opens and disconnects the capacitor winding 3 when the motor has reached about 75% of its full load speed and the motor will then come up to speed and will operate as a single-phase induction motor in the usual manner. It will be seen that the relay coil 16 is now connected directly across the line in series with the capacitor 9 and since the impedance of the coil is relatively high, the current will be quite small and the voltage across the coil will be sufficiently high to hold the relay contacts open.

If it is now desired to stop the motor by plugging, or to rapidly reverse it, while it is rotating in the initial direction, the reversing switch 10 is thrown to its opposite position. In so doing, the switch passes through an intermediate position in which the capacitor winding circuit is disconnected entirely from the line. The coil 16 of the relay 14 is deenergized and immediately closes its contacts. When the switch closes in its other position with the connection of the winding to the line reversed, the motor is then rotating at a negative speed with respect to the windings and the voltage across the winding 3 will be less than the voltage at standstill, so that the relay contacts 15 remain closed and the the winding 3 remains connected to the line to bring the motor rapidly to a stop. When the motor has slowed down to about 50% speed, the centrifugal switch 13 closes. If it is desired to stop the motor, the switch 10 or the line switch 8 is opened when the motor comes to a stop, but if it is desired to reverse the motor, the switches are left closed and the motor speed will pass through zero and increase in the opposite direction of rotation. As soon as the speed passes through zero, the voltage across the winding 3 begins to increase and the relay 14 opens its contacts. Since the centrifugal switch 13 is now closed, however, the motor will continue to accelerate, and will speed up in the opposite direction in the same way as before.

Figure 2:
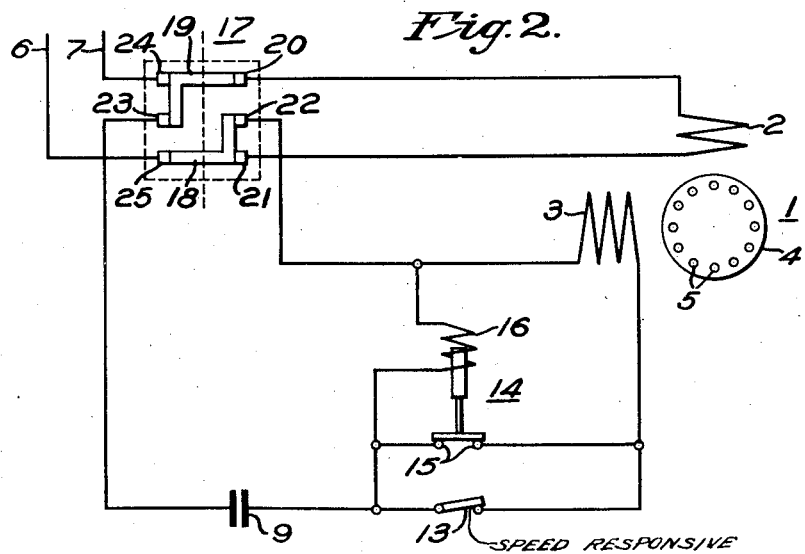
Fig. 2 is a similar diagram showing a slightly modified arrangement.

Figure 2 shows a slight modification of this arrangement in which a drum type controller 17 is used to control the motor. The controller has conducting segments 18 and 19 on its rotating element cooperating with stationary contacts to which the windings are connected. Thus, the main winding 2 is connected to the contacts 20 and 21, and the capacitor winding 3 is connected to contacts 22 and 23. The single-phase supply line 6, 7 is connected to contacts 24 and 25. It will be seen that in the position of the controller shown, both windings are connected in parallel to the line. When the rotating element of the controller is turned through 180°, the main winding will again be connected to the line in the same way, but the connection of the capacitor winding 3 will be reversed. At an intermediate position both windings will be disconnected from the line. The operation of this arrangement is similar to that described above. If it is desired to reverse the motor with the controller in the position shown, it is only necessary to rotate it through 180°. In doing so, the controller passes through its intermediate or off position in which the windings are deenergized, so that the relay 14 closes its contacts, and when the controller reaches its third or reverse position, the connection of the winding 3 is reversed so that the relay contacts remain closed and the motor is rapidly brought to a stop or reversed in the manner described above.

It will be seen that with the arrangement of the present invention the starting winding is always disconnected from the line at the same speed of the motor irrespective of any variations in the line voltage, since it is disconnected by the centrifugal switch 13, the operation of which is dependent only on the speed of the motor. It is also to be noted that the relay contacts 15 are not required to interrupt any appreciable current, since the contacts are opened while the switch 13 is still closed and the relay is used only to reconnect the capacitor winding to the line when it is desired to reverse the motor. For this reason, the contacts can be quite light and a relatively inexpensive relay used.

It will be clear that the arrangement shown is capable of various modifications without departing from the fundamental idea of using a centrifugal switch to disconnect the starting winding at a predetermined speed, and a voltage responsive relay to reconnect it when it is desired to reverse the motor. Thus, it will be apparent that any suitable type of voltage responsive relay and of speed responsive switch may be used, and that the connections may be made in any desired manner to cause the relay to respond to the voltage across the auxiliary winding. The capacitor may be connected at any point in the circuit of the auxiliary winding on either side of the reversing switch, so long as it is not connected between the relay coil and the winding. It is to be understood, therefore, that although a particular embodiment of the invention has been shown and described, it is not limited to the exact arrangement shown but that in its broadest aspect it includes all equivalent embodiments and modifications which come within the scope of the appended claims.

I claim as my invention:

1. In combination, a self-starting single-phase motor having a main primary winding and an auxiliary primary winding, means for connecting said windings to a single-phase supply line, switching means for reversing the connections of one of the windings with respect to the other, speed responsive switch means connected in series with the auxiliary winding for disconnecting it from the line when the motor has reached a predetermined speed, and a voltage relay having contacts which are closed when the relay is deenergized and having a voltage responsive operating coil, said relay contacts being connected in parallel with the speed responsive switch means and said operating coil being connected across the auxiliary winding and the relay contacts.

2. In combination, a self-starting single-phase motor having a main primary winding and an auxiliary primary winding, means for connecting said windings to a single-phase supply line, switching means for reversing the connections of one of the windings with respect to the other, speed responsive switch means connected in series with the auxiliary winding for disconnecting it from the line when the motor has reached a predetermined speed, and a voltage relay having contacts which are closed when the relay is deenergized and having a voltage responsive operating coil, said relay contacts being connected in parallel with the speed responsive switch means and said operating coil being connected across the auxiliary winding and the relay contacts, and being adapted to cause the relay contacts to open when the voltage across the auxiliary winding is slightly greater than the voltage at standstill.

3. In combination, a self-starting single-phase motor having a main primary winding and an auxiliary primary winding connected to a single-phase supply line, means for causing a phase displacement between the currents in said windings, switching means for reversing the connections of the auxiliary winding with respect to the main winding, speed responsive switch means connected in series with the auxiliary winding for disconnecting it from the line when the motor has reached a predetermined speed, and a voltage relay having contacts which are closed when the relay is in its deenergized position and having a voltage responsive operating coil, said relay contacts being connected in parallel with the speed-responsive switch means, and said operating coil being connected across the auxiliary winding and the relay contacts.

4. In combination, a self-starting single-phase motor having a main primary winding and an auxiliary primary winding connected to a single-phase supply line, means for causing a phase displacement between the currents in said windings, switching means for reversing the connections of the auxiliary winding with respect to the main winding, speed responsive switch means connected in series with the auxiliary winding for disconnecting it from the line when the motor has reached a predetermined speed, and a voltage relay having contacts which are closed when the relay is in its deenergized position and having a voltage responsive operating coil, said relay contacts being connected in parallel with the speed-responsive switch means, and said operating coil being connected across the auxiliary winding and the relay contacts, the operating coil being adapted to cause the relay contacts to open when the voltage across the auxiliary winding is slightly greater than the voltage at standstill.

5. In combination, a self-starting, single-phase motor having a main primary winding and an auxiliary primary winding, means for connecting said windings to a single-phase supply line, a capacitor connected in series with the auxiliary winding for causing a phase displacement between the currents in the windings, switching means for momentarily disconnecting said windings from the line and reconnecting them with one of the windings reversed with respect to the other one, a voltage relay having contacts connected in series with the auxiliary winding and having a voltage responsive operating coil connected across the auxiliary winding and the relay contacts to cause operation of the relay in response to the voltage across the auxiliary winding, and speed responsive switch means connected in parallel with the relay contacts and adapted to open when the motor has reached a predetermined speed.

6. In combination, a self-starting, single-phase motor having a main primary winding and an auxiliary primary winding, means for connecting said windings to a single-phase supply line, a capacitor connected in series with the auxiliary winding for causing a phase displacement between the currents in the windings, switching means for momentarily disconnecting said windings from the line and reconnecting them with one of the windings reversed with respect to the other one, a voltage relay having contacts connected in series with the auxiliary winding and having a voltage responsive operating coil connected across the auxiliary winding and the relay contacts, and adapted to cause the contacts to open when the voltage across the auxiliary winding is somewhat greater than the voltage at standstill, and speed responsive switch means connected in parallel with the relay contacts and adapted to open when the motor has reached a predetermined speed.

7. In combination, a self-starting single-phase motor having a main primary winding and an auxiliary primary winding, means for connecting said windings to a single-phase supply line, means for causing a phase displacement between the currents in said windings, a voltage relay having contacts connected in series with the auxiliary winding and having a voltage responsive operating coil connected across the auxiliary winding and the relay contacts, said operating coil being adapted to cause the relay contacts to open when the voltage across the auxiliary winding exceeds a predetermined value, speed responsive switch means connected in parallel with the relay contacts and adapted to open when the motor reaches a predetermined speed, and switching means for controlling the operation of the motor, said switching means being effective to momentarily disconnect the windings from the line and to reconnect them with one of the windings reversed, whereby the voltage across the auxiliary winding drops and permits the relay to close its contacts to effect rapid stopping or reversing of the motor.

8. In combination, a self-starting single-phase motor having a main primary winding and an auxiliary primary winding, means for connecting said windings to a single-phase supply line, means for causing a phase displacement between the currents in said windings, a voltage relay having contacts connected in series with the auxiliary winding and having a voltage responsive operating coil connected across the auxiliary winding and the relay contacts, said operating coil being adapted to cause the relay contacts to open when the voltage across the auxiliary winding exceeds a predetermined value, speed responsive switch means connected in parallel with the relay contacts and adapted to open when the motor reaches a predetermined speed, and switching means for controlling the operation of the motor, said switching means having a first position in which both windings are connected to the line, a second position in which the windings are momentarily disconnected so that there is no voltage across the auxiliary winding and the relay closes its contacts, and a third position in which the windings are reconnected to the line with the auxiliary winding reversed while the motor is still rotating in its original direction, whereby the voltage across the auxiliary winding is low enough to permit the relay contacts to remain closed to effect rapid stopping or reversing of the motor.

LLOYD W. BUCHANAN.